B. NINO.
BAKING OVEN.
APPLICATION FILED DEC. 16, 1909.
975,272.
Patented Nov. 8, 1910.
3 SHEETS—SHEET 1.
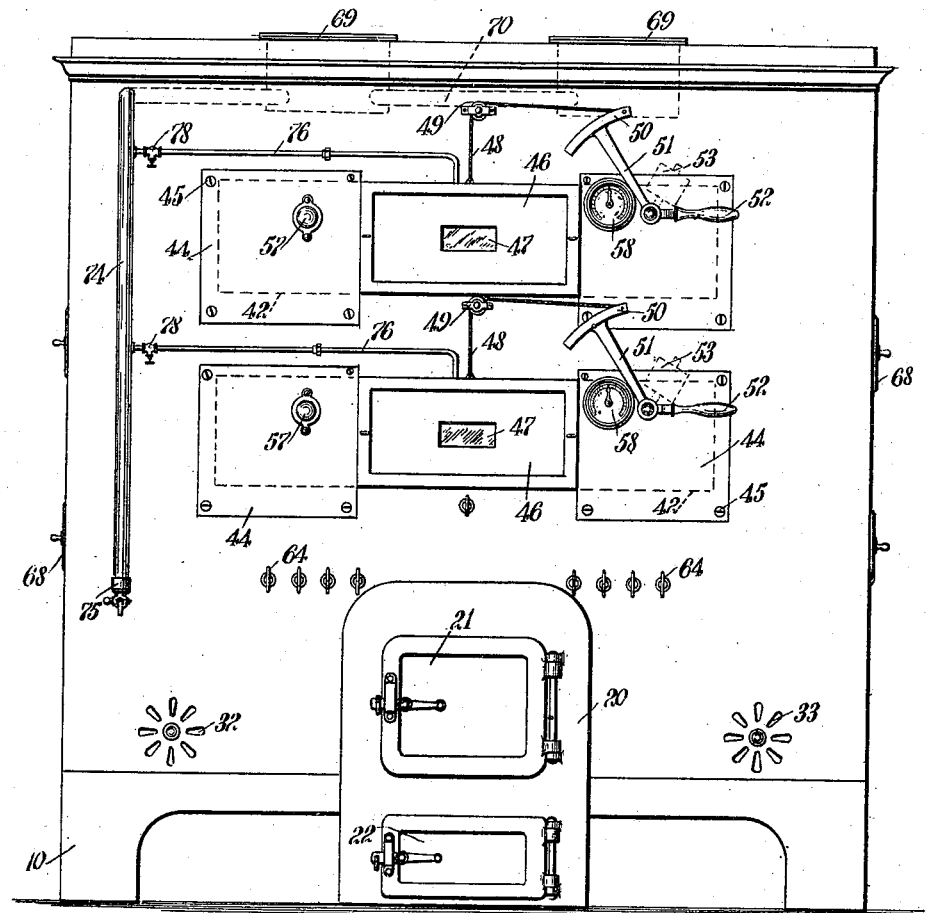
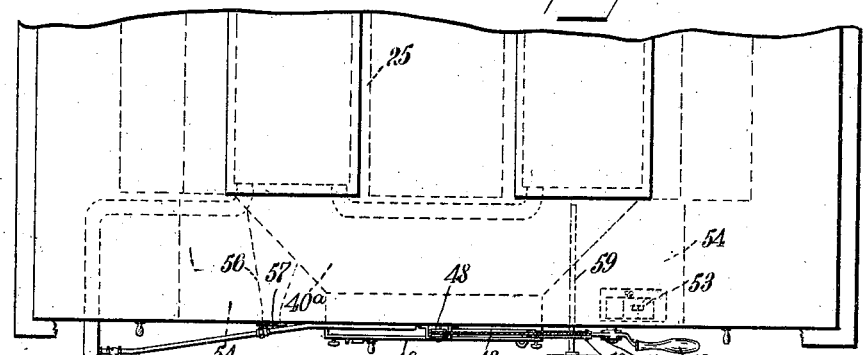
WITNESSES:
INVENTOR
Baptiste Nino
BY
ATTORNEYS

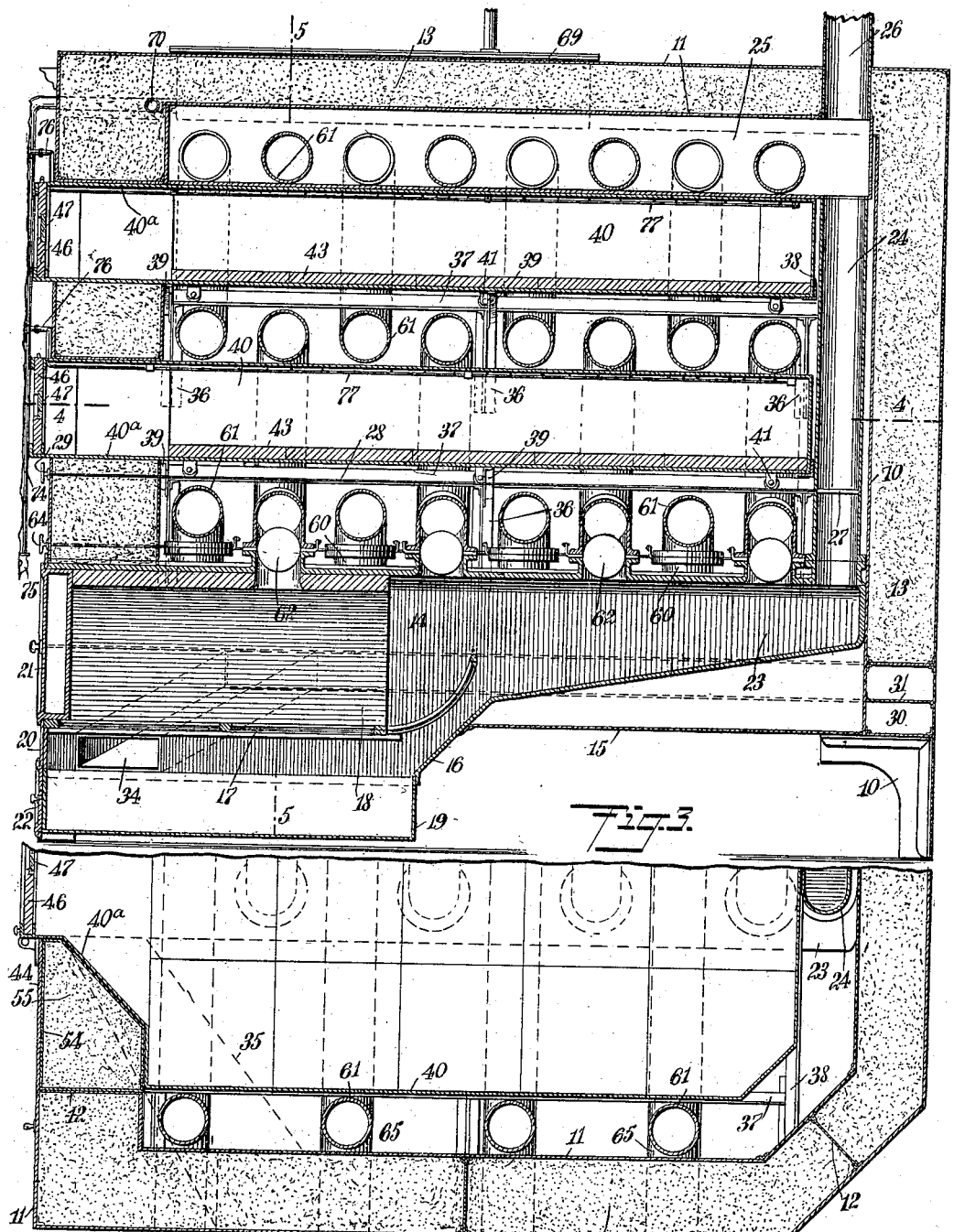

B. NINO.
BAKING OVEN.
APPLICATION FILED DEC. 16, 1909.
975,272.
Patented Nov. 8, 1910.
3 SHEETS—SHEET 3.
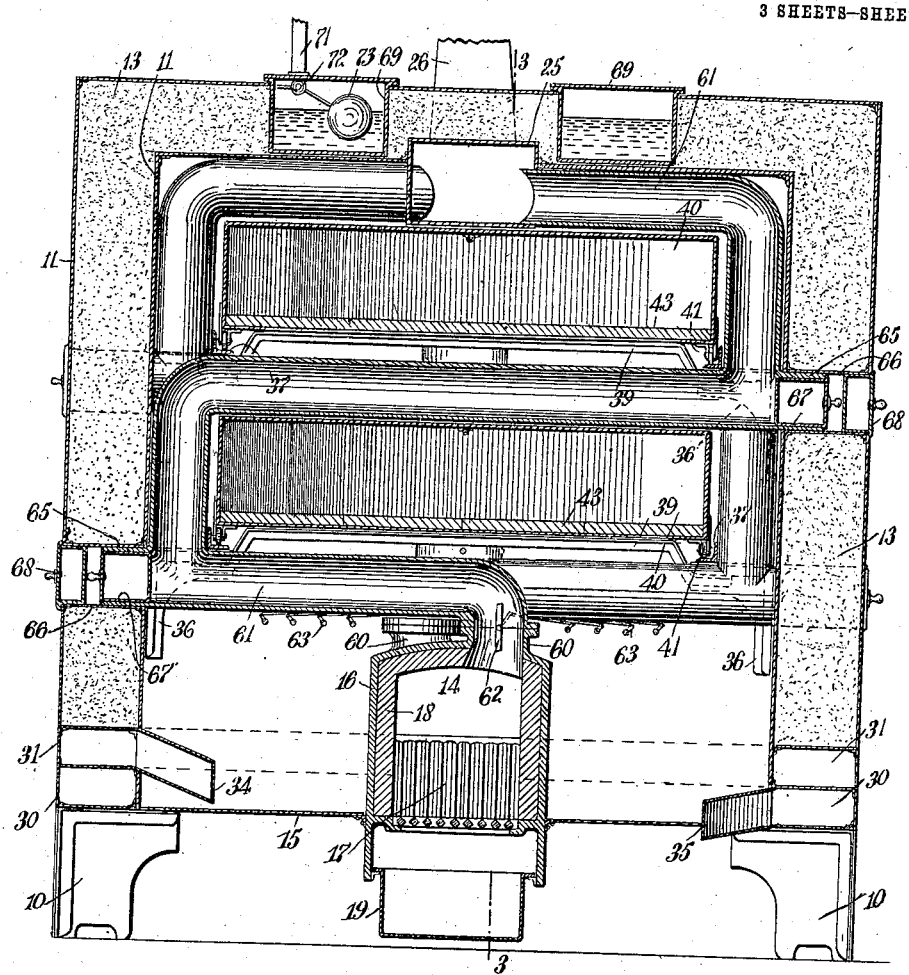
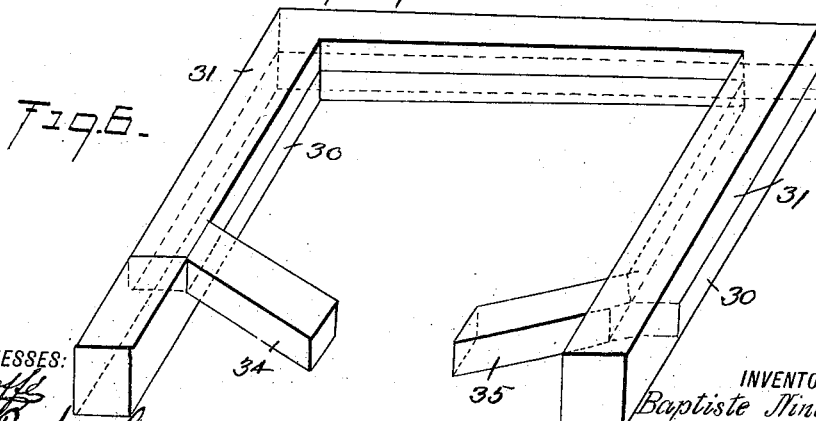
WITNESSES:
INVENTOR
Baptiste Nino
BY
ATTORNEYS

UNITED STATES PATENT OFFICE.

BAPTISTE NINO, OF NEW YORK, N. Y.

BAKING-OVEN.

975,272.
Specification of Letters Patent.
Patented Nov. 8, 1910.

Application filed December 16, 1909. Serial No. 533,333.

*To all whom it may concern:*

Be it known that I, BAPTISTE NINO, a subject of the King of Italy, and a resident of the city of New York, borough of Manhattan, in the county and State of New York, have invented a new and Improved Baking-Oven, of which the following is a full, clear, and exact description.

This invention relates to baking ovens, and has reference more particularly to an oven of this kind which has a baking chamber casing, a furnace, and flues arranged to encompass the baking chamber casing, so that the heat from the furnace is uniformly distributed about the casing.

The object of the invention is to provide a simple and efficient oven for use in baking bread and other foods or the like, in which the fuel is consumed most economically and with an excellent distribution of the resulting heat, which is so constructed that the heat distributing flues can be easily cleaned when necessary, in which the regulation of the fire interferes in no way with the baking operation itself, and in which means are provided for introducing a spray of water into the baking chamber casing to moisten the articles being baked, when necessary.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a front elevation of an embodiment of my invention; Fig. 2 is a plan view of the front portion of the oven; Fig. 3 is a longitudinal section of the oven, on the line 3—3 of Fig. 5; Fig. 4 is a horizontal, longitudinal section on the line 4—4 of Fig. 3; Fig. 5 is a transverse section on the line 5—5 of Fig. 3; and Fig. 6 is a perspective view showing certain details of construction.

Before proceeding to a more detailed explanation of my invention, it should be clearly understood that while the oven is particularly useful in baking bread, pastry and the like, it can also be advantageously employed for other, similar purposes, for example, the baking of cores for foundry use. I prefer to fashion the casing of the oven from sheet iron, and to employ between the outer and inner walls of the outer casing, heat insulating fillings such as ashes or like granular material. Certain of the details of construction form no part of my invention and can be varied in accordance with individual preference and special conditions, without departing from the underlying spirit of the invention.

Referring more particularly to the drawings, I provide a main casing mounted upon foot supports 10, and comprising double walls 11 connected by suitable bracing partitions 12, and having therebetween a filling 13 of heat-insulating material. The casing consists of sides, a top, a back, and a front, and may be of any suitable cross-sectional form. Centrally disposed with respect to the casing and extending longitudinally thereof, is the stove or furnace 14, mounted in an opening of the oven bottom 15, and comprising a furnace casing 16, having a suitable grate 17, upon which the coal or other fuel is burned. Preferably, the furnace casing has an inner lining 18, of fire-brick or other suitable material. Underneath it, the casing has an ash-box 19. At the front of the oven the furnace casing has a face plate or front 20, provided with a furnace door 21 and an ash-box door 22. These doors may be of any suitable form, and are shown in Fig. 1. The furnace casing has a rearward extension 23, the bottom of which is preferably upwardly inclined, and which communicates at the end with a smoke-flue 24, passing upwardly through the oven to a flue-box 25, arranged centrally of the oven casing and extending longitudinally thereof. The flue-box has a smoke outlet or chimney 26, projecting through the top of the oven casing and preferably registering with the smoke-flue 24. The latter has near the extension 23 of the furnace, a suitable damper 27, operable by means of a rod 28, which extends through the front of the oven, and at the outside has a manipulating grip 29.

Superposed air conduits 30 and 31, are arranged between the double walls of the oven casing, at the lower portions thereof and extend around the furnace as is shown most clearly in Figs. 3 and 5. The air conduits communicate respectively with inlets 32 and 33 at the front of the oven casing and they are connected with the furnace under the grate of the same, by means of downwardly inclined connecting conduits 34 and 35. The arrangement is such that the air entering through one of the inlets 32 and 33, passes completely around the oven, before entering the grate, so that it is, to a certain extent, preheated. This renders the combustion of the fuel more efficient. The inlets 32 and 33 preferably have adjusting devices to regulate the amount of air entering the furnace.

Within the casing are superposed supporting carriers or brackets 36, near the corners; mounted upon them and extending longitudinally of the oven, are angle members 37. At the rear is a similar, transverse angle member 38. Upwardly offset transverse members 39 are arranged across the oven at the forward brackets 36, and likewise connect intermediate brackets 36 between the corner brackets. Baking chamber casings 40 fashioned from sheet metal are movably mounted by means of supporting wheels or rollers 41 upon the angle carriers 37 which constitute tracks. The front of the oven has openings 42 permitting the insertion and removal of the baking chamber casings 40. The latter preferably have on the bottoms, fire-proof linings 43 fashioned from any suitable material. The opposite ends of the openings 42 are closed by face plates 44 removably mounted in place by means of screws 45 or the like. Sliding doors 46 having windows 47 are mounted between the face plates 44, and are operated by lines 48 passing around pulleys 49 secured upon the front of the oven. The lines are secured to segment ends 50 of operating levers 51 pivoted upon corresponding plates 44, and having handles 52 by means of which they can be manipulated. Between the double walls of the front of the oven are arranged counterweights 53, operatively connected with the levers 51 and serving to counterbalance the weights of the doors 46, so that they can be held in any desired positions. The baking chamber casings have forward inlet extensions 40ª to the doors 46.

Behind each of the face plates 45 and substantially filling the corresponding portions of the openings 42 are boxes 54, having heat insulating fillings 55, similar to that between the double walls of the oven casing. The ends of the boxes 54 are inclined, like the extensions 40ª, to facilitate the introduction of the articles to be baked, laterally into the baking chamber casings. Two of the boxes 54 have therethrough inwardly flared openings 56, provided with closures 57, so that electric lights can be introduced into the baking chamber casings to permit the articles to be inspected through the windows 47. If so desired, thermometers 58, having stems 59 projecting into the baking chamber casings, can be employed with the oven, so that the baking temperatures can at all times be ascertained.

The furnace casing, at the top, has a plurality of flanged outlet necks 60, the alternate necks being arranged at opposite sides of the casing. Flues 61 having the lower extremities flanged, are suitably mounted upon the outlet necks 60 and the alternate flues extend around the baking chamber casings in opposite directions, each flue being S-shaped as is shown most clearly in Fig. 5, and terminating at the flue box. Near the lower ends, the flues have dampers 62, controlled by rods 63, having at the front of the oven casing, handles 64, by means of which they can be easily manipulated. The two lower horizontal runs or portions of each flue have sleeve extensions 65, projecting into openings 66, of the sides of the oven casing. They are provided with stoppers 67, the openings 66 of the sides being likewise provided with stoppers 68. When the stoppers are removed, suitable implements can be introduced into the corresponding portions of the flues to permit the cleaning of the same. It will be understood that the heat from the furnace will pass upward through the flues, and completely around the baking chamber casings, heating the latter uniformly and to a high degree. The amount of heat can of course be regulated by means of the dampers.

Set into the openings of the top of the oven casing, at each side of the flue box, are water containers or boilers 69 connected by a pipe 70. One of the containers has an inlet pipe 71 provided with a valve 72 controlled by a float 73. An outlet pipe 74 is mounted upon the front of the oven casing and communicates with one of the boilers 69, having at the lower end a drip or emptying cock 75. Smaller pipes 76 communicate with the pipes 74 and have parts 77 extending into the respective baking chamber casings. The parts 77 of the pipes are perforated, so that water or steam can be introduced into the baking chamber casings when desired. The pipes 76 are provided with suitable cocks 78 for regulating the flow therethrough.

Having thus described my invention, I claim as new, and desire to secure by Letters Patent:

1. In a baking oven, a furnace, and an air conduit having at one end an inlet, and extending around said oven, said air conduit having at the other end an outlet communicating with said furnace at the side thereof opposite to said inlet of said air conduit.

2. In a baking oven, a furnace, and air conduits having inlets and extending around the oven in opposite directions and communicating with said furnace at opposite sides thereof.

3. In a baking oven, an outer casing, a furnace within said outer casing, independent air conduits having inlet openings and extending around said furnace within said casing, said air conduits communicating with said furnace at opposite sides thereof and at points remote from their respective air inlets.

4. In a baking oven, a double-walled casing, a furnace within said casing near the lower part thereof, a baking chamber casing above said furnace, flues extending from said furnace around said baking chamber casing, and superposed air-conduits extending around said furnace between the double walls of the oven, each of said conduits having at one end an inlet and at the other end an outlet communicating with said furnace, each conduit having its respective inlet and outlet at opposite ends.

5. In a baking oven, an outer casing, a furnace therein, and a removable closed baking chamber casing within said outer casing adjacent to said furnace.

6. In a baking oven, an outer casing, a furnace therein, independently removable inclosed baking chamber casings above said furnace, and flues connected with said furnace and extending around said baking chamber casings.

7. In a baking oven, an outer casing, carrier brackets mounted within said casing, tracks mounted upon said brackets, a closed baking chamber casing movably mounted upon said tracks, a furnace within said outer casing, and flues connected with said furnace and extending around said baking chamber casing.

8. In a baking oven, an outer casing, carrier brackets mounted within said casing, tracks carried by said brackets, transverse members connecting said brackets, a removable baking chamber casing having supporting rollers upon said tracks, said transverse members serving to support said baking chamber casing, a furnace within said outer casing, and flues communicating with said furnace and extending around said baking chamber casing.

9. In a baking oven, an outer casing, a plurality of carrier brackets within said casing, superposed tracks supported by said brackets, transverse members connecting said brackets, independently movable baking chamber casings having rollers whereby they are movably mounted upon said tracks, a furnace within said outer casing, and flues communicating with said furnace and extending in opposite directions around said baking chamber casings.

10. In a baking oven, an outer casing having openings, removable baking chamber casings within said outer casing and adapted to be introduced and removed through said openings, removable face plates partly closing said openings, and doors completely closing said openings.

11. In a baking oven, an outer casing having openings, removable baking chamber casings within said outer casing and adapted to be introduced and removed through said openings, removable face plates at both ends of each of said openings and partly closing the same, sliding doors between said face plates of each of said openings and adapted to close said openings, and means including counterweights, for independently operating said sliding doors.

12. In a baking oven, an outer, double-walled casing having a filling between the walls thereof, of heat insulating material, said casing having an opening, a removable baking chamber casing within said outer casing and adapted to be introduced and removed through said opening, boxes having fillings of heat insulating material removably positioned within said opening and partly closing the same, removable face plates mounted upon said outer casing outside of said boxes, and a door movably positioned between said face plates.

13. In a baking oven, an outer, double-walled casing having a filling between the walls thereof, of heat insulating material, said casing having an opening, a removable baking chamber casing within said outer casing and adapted to be introduced and removed through said opening, boxes having fillings of heat insulating material removably positioned within said opening and partly closing the same, removable face plates mounted upon said outer casing outside of said boxes, said baking chamber casing having a tapered entrance extension between said boxes, said boxes having the inner sides inclined to conform to the shape of said extension, and a door movably positioned between said face plates.

14. In a baking oven, a double walled outer casing, a baking chamber casing within said outer casing, a furnace, flues communicating with said furnace and extending around said baking chamber casing, said outer casing having an opening giving access to said baking chamber casing, a sliding door mounted at said opening, a pivoted member having an arm provided with a segment, a flexible member connecting said segment and said sliding door, a pulley for guiding said flexible member, said pivoted member having an operating handle, and a counterweight associated with said pivoted member and positioned between the double walls of said outer casing.

In testimony whereof I have signed my name to this specification in the presence of two subscribing witnesses.

BAPTISTE NINO.

Witnesses:
   JOHN K. BRACHVOGEL,
   PHILIP D. ROLLHAUS.